United States Patent
Takahashi et al.

(10) Patent No.: US 9,661,660 B2
(45) Date of Patent: May 23, 2017

(54) RADIO BASE STATION AND MOBILE STATION

(71) Applicant: NTT DOCOMO, INC., Tokyo (JP)

(72) Inventors: Hideaki Takahashi, Tokyo (JP); Wuri Andarmawanti Hapsari, Tokyo (JP); Kenichiro Aoyagi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 17 days.

(21) Appl. No.: 14/401,853

(22) PCT Filed: May 17, 2013

(86) PCT No.: PCT/JP2013/063751
§ 371 (c)(1),
(2) Date: Nov. 18, 2014

(87) PCT Pub. No.: WO2013/172439
PCT Pub. Date: Nov. 21, 2013

(65) Prior Publication Data
US 2015/0173104 A1 Jun. 18, 2015

(30) Foreign Application Priority Data

May 18, 2012 (JP) .................. 2012-114786
Jul. 6, 2012 (JP) .................. 2012-152343

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0053* (2013.01); *H04W 4/22* (2013.01);
(Continued)

(58) Field of Classification Search
CPC ..... H04L 1/0001; H04L 27/22; H04L 7/0334; H04B 1/28; H04B 1/00
(Continued)

(56) References Cited

U.S. PATENT DOCUMENTS 8,054,758 B2 * 11/2011 Chun .................. H04W 76/048
370/252
2008/0101306 A1 * 5/2008 Bertrand ............. H04L 27/2613
370/336
(Continued)

OTHER PUBLICATIONS

International Search Report for corresponding International Application No. PCT/JP2013/063751, mailed Aug. 6, 2013 (1 page).
(Continued)

*Primary Examiner* — Jae Y Lee
*Assistant Examiner* — Jean F Voltaire
(74) *Attorney, Agent, or Firm* — Osha Liang LLP (57) ABSTRACT

To improve probability of successfully performing transmission processing by a priority terminal and transmission processing of an emergency call even during congestion. A radio base station eNB according to the present invention includes a RA procedure execution unit 11 configured to execute a RA procedure with a mobile station UE when the mobile station UE returns from a DRX state to a non-DRX state. The RA procedure execution unit 11 is configured to transmit a predetermined MAC-CE in response to a MAC-CE received from the mobile station UE in the above RA procedure, when rejecting the return.

23 Claims, 8 Drawing Sheets (51) Int. Cl.
*H04W 8/26* (2009.01)
*H04W 4/22* (2009.01)
*H04W 76/00* (2009.01)
*H04W 74/00* (2009.01)
*H04W 88/08* (2009.01)
*H04W 76/04* (2009.01)

(52) U.S. Cl.
CPC ........... *H04W 8/26* (2013.01); *H04W 76/007* (2013.01); *H04L 5/001* (2013.01); *H04W 74/004* (2013.01); *H04W 74/006* (2013.01); *H04W 76/048* (2013.01); *H04W 88/08* (2013.01)

(58) Field of Classification Search
USPC ........................................................ 370/350
See application file for complete search history.

(56) References Cited

U.S. PATENT DOCUMENTS

| | | | | |
|---|---|---|---|---|
| 2009/0196230 A1* | 8/2009 | Kim | ............. | H04W 74/002 370/328 |
| 2011/0045863 A1* | 2/2011 | Lee | ............. | H04L 5/0007 455/517 |
| 2011/0143712 A1* | 6/2011 | Christensson | ............. | H04W 48/02 455/410 |
| 2012/0093011 A1* | 4/2012 | Ranta-Aho | ............. | H04L 5/0007 370/252 |
| 2012/0176950 A1* | 7/2012 | Zhang | ............. | H04L 5/001 370/311 |
| 2013/0258882 A1* | 10/2013 | Dinan | ............. | H04W 56/001 370/252 |

OTHER PUBLICATIONS

Written Opinion for corresponding International Application No. PCT/JP2013/063751, mailed Aug. 6, 2013 (3 pages).
3GPP TS 36.331 V11.3.0; "3rd Generation Partnership Project; Technical Specification Group Radio Access Network; Evolved Universal Terrestrial Radio Access (E-UTRA); Radio Resource Control (RRC); Protocol specification (Release 11);" Mar. 2013 (344 pages).
3GPP TS 36.321 V11.2.0; "3rd Generation Partnership Project; Technical Specification Group Radio Access Network; Evolved Universal Terrestrial Radio Access (E-UTRA); Medium Access Control (MAC) protocol specification (Release 11);" Mar. 2013 (56 pages).
3GPP TS 36.213 V10.5.0; "3rd Generation Partnership Project; Technical Specification Group Radio Access Network; Evolved Universal Terrestrial Radio Access (E-UTRA); Physical Layer procedures (Release 10);" Mar. 2012 (125 pages).
3GPP TS 36.211 V10.4.0; "3rd Generation Partnership Project; Technical Specification Group Radio Access Network; Evolved Universal Terrestrial Radio Access (E-UTRA); Physical Channels and Modulation (Release 10);" Dec. 2011 (101 pages).
3GPP TS 36.300 V11.1.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Mar. 2012 (194 pages).
3GPP TS 36.300 V10.7.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10);" Mar. 2012 (194 pages).

* cited by examiner

TABLE 6.2.1-1 VALUES OF LCID FOR DL-SCH

| INDEX | LCID VALUES |
|---|---|
| 00000 | CCCH |
| 00001-01010 | IDENTITY OF THE LOGICAL CHANNEL |
| 01011-11001 | RESERVED |
| 11010 | RA PROCEDURE REJECT |
| 11011 | ACTIVATION/DEACTIVATION |
| 11100 | UE CONTENTION RESOLUTION IDENTITY |
| 11101 | TIMING ADVANCE COMMAND |
| 11110 | DRX COMMAND |
| 11111 | PADDING |

FIG. 5

RACH-ConfigCommon information element

```
-- ASN1START

RACH-ConfigCommon ::=            SEQUENCE {
    preambleInfo                        SEQUENCE {
        numberOfRA-Preambles                ENUMERATED {
                                                n4, n8, n12, n16 ,n20, n24, n28,
                                                n32, n36, n40, n44, n48, n52, n56,
                                                n60, n64},
        preamblesGroupAConfig               SEQUENCE {
            sizeOfRA-PreamblesGroupA            ENUMERATED {
                                                    n4, n8, n12, n16 ,n20, n24, n28,
                                                    n32, n36, n40, n44, n48, n52, n56,
                                                    n60},
            messageSizeGroupA                   ENUMERATED {b56, b144, b208, b256},
            messagePowerOffsetGroupB            ENUMERATED {
                                                    minusinfinity, dB0, dB5, dB8, dB10, dB12,
                                                    dB15, dB18},
            ...
        }   OPTIONAL                                                      -- Need OP
    },
    powerRampingParameters              SEQUENCE {
        powerRampingStep                    ENUMERATED {dB0, dB2,dB4, dB6},
        preambleInitialReceivedTargetPower  ENUMERATED {
                                                dBm-120, dBm-118, dBm-116, dBm-114, dBm-112,
                                                dBm-110, dBm-108, dBm-106, dBm-104, dBm-102,
                                                dBm-100, dBm-98, dBm-96, dBm-94,
                                                dBm-92, dBm-90}
    },
    ra-SupervisionInfo                  SEQUENCE {
        preambleTransMax                    ENUMERATED {
                                                n3, n4, n5, n6, n7, n8, n10, n20, n50,
                                                n100, n200},
        ra-ResponseWindowSize               ENUMERATED {
                                                sf2, sf3, sf4, sf5, sf6, sf7,
                                                sf8, sf10},
        mac-ContentionResolutionTimer       ENUMERATED {
                                                sf8, sf16, sf24, sf32, sf40, sf48,
                                                sf56, sf64}
    },
    maxHARQ-Msg3Tx                      INTEGER (1..8),
    ...,
    [[ waitTime                         INTEGER (1..16),        OPTIONAL    -- Need ON,
    ]]
}

-- ASN1STOP
```

FIG. 6

| RACH-ConfigCommon field descriptions |
|---|
| *mac-ContentionResolutionTimer* <br> Timer for contention resolution in TS 36.321 [6]. Value in subframes. Value sf8 corresponds to 8 subframes, sf16 corresponds to 16 subframes and so on. |
| *maxHARQ-Msg3Tx* <br> Maximum number of Msg3 HARQ transmissions in TS 36.321 [6], used for contention based random access. Value is an integer. |
| *messagePowerOffsetGroupB* <br> Threshold for preamble selection in TS 36.321 [6]. Value in dB. Value minusinfinity corresponds to −infinity. Value dB0 corresponds to 0 dB, dB5 corresponds to 5 dB and so on. |
| *messageSizeGroupA* <br> Threshold for preamble selection in TS 36.321 [6]. Value in bits. Value b56 corresponds to 56 bits, b144 corresponds to 144 bits and so on. |
| *numberOfRA-Preambles* <br> Number of non-dedicated random access preambles in TS 36.321 [6]. Value is an integer. Value n4 corresponds to 4, n8 corresponds to 8 and so on. |
| *powerRampingStep* <br> Power ramping factor in TS 36.321 [6]. Value in dB. Value dB0 corresponds to 0 dB, dB2 corresponds to 2 dB and so on. |
| *preambleInitialReceivedTargetPower* <br> Initial preamble power in TS 36.321 [6]. Value in dBm. Value dBm-120 corresponds to -120 dBm, dBm-118 corresponds to -118 dBm and so on. |
| *preamblesGroupAConfig* <br> Provides the configuration for preamble grouping in TS 36.321 [6]. If the field is not signalled, the size of the random access preambles group A [6] is equal to *numberOfRA-Preambles*. |
| *preambleTransMax* <br> Maximum number of preamble transmission in TS 36.321 [6]. Value is an integer. Value n3 corresponds to 3, n4 corresponds to 4 and so on. |
| *ra-ResponseWindowSize* <br> Duration of the RA response window in TS 36.321 [6]. Value in subframes. Value sf2 corresponds to 2 subframes, sf3 corresponds to 3 subframes and so on. |
| *sizeOfRA-PreamblesGroupA* <br> Size of the random access preambles group A in TS 36.321 [6]. Value is an integer. Value n4 corresponds to 4, n8 corresponds to 8 and so on. |
| *waitTime* <br> Wait time value in seconds. |

| VALUE (HEXA-DECIMAL) | RNTI |
|---|---|
| 0000 | N/A |
| 0001-003C | RA-RNTI, C-RNTI, SEMI-PERSISTENT SCHEDULING C-RNTI, TEMPORARY C-RNTI, TPC-PUCCH-RNTI AND TPC-PUSCH-RNTI (SEE NOTE) |
| 003D-FFF3 | C-RNTI, SEMI-PERSISTENT SCHEDULING C-RNTI, TEMPORARY C-RNTI, TPC-PUCCH-RNTI AND TPC-PUSCH-RNTI |
| FFF4-FFFB | RESERVED FOR FUTURE USE |
| FFFC | RA-REJECT-RNTI |
| FFFD | M-RNTI |
| FFFE | P-RNTI |
| FFFF | SI-RNTI |

FIG. 10

RADIO BASE STATION AND MOBILE STATION

TECHNICAL FIELD

The present invention relates to a radio base station and a mobile station.

BACKGROUND ART

In a mobile communication system of the LTE (Long Term Evolution), transmission of "RA (Random Access) Request" for transmitting a signal relating to transmission processing (including location registration processing, this also applies hereinafter) such as, for example, location registration processing signaling (MO-signalling) and U-plane transmission processing signaling (MO-data) can be restricted by a mobile station UE in the RRC_IDLE state (idle state) by using a mechanism of ACB (Access Class Barring).

PRIOR ART DOCUMENTS

Non-Patent Documents

Non-patent Document 1: 3GPP TS36.300
Non-patent Document 2: 3GPP TS36.211
Non-patent Document 3: 3GPP TS36.213
Non-patent Document 4: 3GPP TS36.321
Non-patent Document 5: 3GPP TS36.331

SUMMARY OF THE INVENTION

However, in a mobile communication system of the conventional LTE, ACB cannot be performed on a transmission of "RA Preamble" in a RA procedure performed by a mobile station UE in a RRC_CONNECTED state (connected state) and a DRX (Discontinuous Reception) state (intermittent reception state) in response to "UL data arrival", in other words, the transmission of the "RA Preamble" cannot be restricted.

Accordingly, there are problems that "RA preamble" transmitted in a RA procedure for performing transmission processing by a priority terminal or transmission processing of an emergency call during congestion collides with the above-mentioned "RA Preamble" and thereby causes failure of the RA procedure, and depletion of network resources and congestion of processing when returning to the DRX state may cause a delay or failure of the transmission processing.

Thus, the present invention has been made in view of such circumstances and has an objective of providing a radio base station and a mobile station capable of improving the probability of successfully performing transmission processing by a priority terminal and transmission processing of an emergency call even during congestion.

A first feature of the present invention is summarized as a radio base station including: a random access procedure execution unit configured to execute a random access procedure with a mobile station when the mobile station returns from an intermittent reception state to a continuous reception state. Here, the random access procedure execution unit is configured to transmit a predetermined MAC control element in response to a MAC control element received from the mobile station in the random access procedure, when rejecting the return.

A second feature of the present invention is summarized as a radio base station including: a random access procedure execution unit configured to execute a random access procedure with a mobile station when the mobile station returns from an intermittent reception state to a continuous reception state. Here, the random access procedure execution unit is configured to transmit a physical downlink control channel using a predetermined RNTI instead of transmitting a physical downlink control channel using a C-RNTI notified by a MAC control element received from the mobile station in the RA procedure, when rejecting the return.

A third feature of the present invention is summarized as a mobile station including: a random access procedure execution unit configured to execute a random access procedure with a radio base station when returning from an intermittent reception state to a continuous reception state; and a state management unit configured to determine to remain in the intermittent reception state when the random access procedure execution unit receives, in the random access procedure, a predetermined MAC control element in response to a MAC control element transmitted from the mobile station to the radio base station.

A fourth feature of the present invention is summarized as a mobile station including: a random access procedure execution unit configured to execute a random access procedure with a radio base station when returning from an intermittent reception state to a continuous reception state; and a state management unit configured to determine to remain in the intermittent reception state when the random access procedure execution unit receives, in the random access procedure, a physical downlink control channel using a predetermined RNTI instead of a physical downlink channel using a C-RNTI notified by a MAC control element transmitted from the mobile station to the radio base station.

A fifth feature of the present invention is summarized as a radio base station including: a random access procedure execution unit configured to execute a random access procedure with a mobile station when the mobile station returns from an intermittent reception state to a continuous reception state. Here, the random access procedure execution unit is configured to transmit a connection release message in response to a MAC control element received from the mobile station in the random access procedure, when rejecting the return.

A sixth feature of the present invention is summarized as a mobile station including: a random access procedure execution unit configured to execute a random access procedure with a radio base station when returning from an intermittent reception state to a continuous reception state; and a state management unit configured to determine to remain in the intermittent reception state when the random access procedure execution unit receives, in the random access procedure, a connection release message in response to a MAC control element transmitted from the mobile station to the radio base station.

BRIEF DESCRIPTION OF THE DRAWINGS

FIG. 6 is a diagram showing an example of "RACH-ConfigCommon" transmitted by the radio base station according to the first embodiment of the present invention.

DETAILED DESCRIPTION (Mobile Communication System According to the First Embodiment of the Present Invention)

The mobile communication system according to the first embodiment of the present invention is described with reference to FIGS. 1 to 8.

Figure 1:
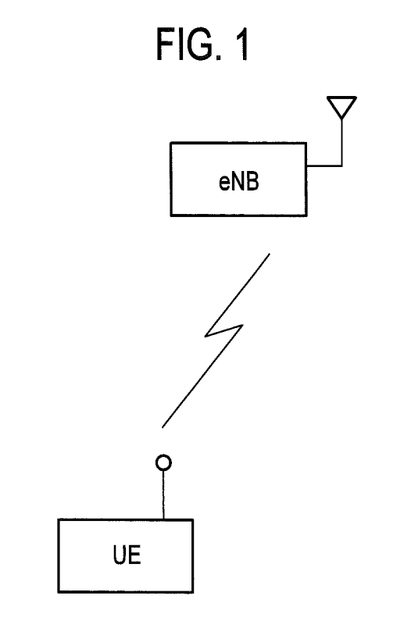
FIG. 1 is an overall configuration diagram of a mobile communication system according to a first embodiment of the present invention.

The mobile communication system according to this embodiment supports the LTE scheme, and includes a radio base station eNB and a mobile station UE, as shown in FIG. 1.

Figure 2:
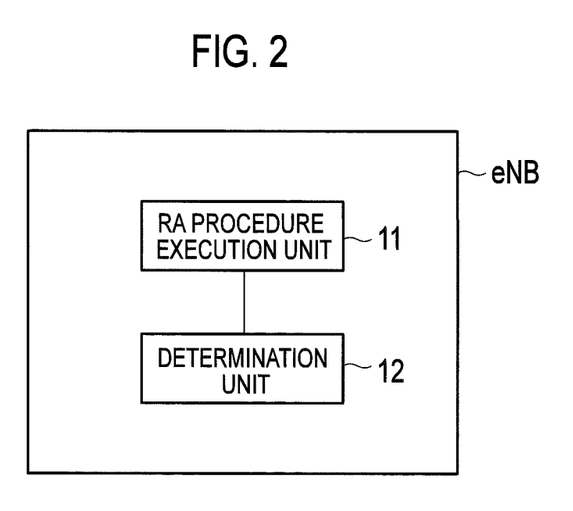
FIG. 2 is a functional block diagram of a radio base station according to the first embodiment of the present invention.

As shown in FIG. 2, the radio base station eNB according to this embodiment includes a RA procedure execution unit 11 and a determination unit 12.

The RA procedure execution unit 11 is configured to perform RA (Random Access) procedure with the mobile station UE.

For example, when the mobile station UE returns from the DRX state to the non-DRX state or when the mobile station UE shifts from the RRC_IDLE state to the RRC_CONNECTED state, the RA procedure execution unit 11 is configured to execute the RA procedure with the mobile station UE.

Here, a RA procedure for the mobile station UE returning from the DRX state to the non-DRX state, and a RA procedure for the mobile station UE shifting from the RRC_IDLE state to the RRC_CONNECTED state are different from each other.

The determination unit 12 is configured to determine whether or not to accept the return of the mobile station UE from the DRX state to the non-DRX state, in a RA procedure (Contention Based RA Procedure) for the return.

For example, the determination unit 12 may be configured to make such determination according to congestion status of a radio access network, a predetermined operator rule, etc.

Further, when rejecting the return or when the return is rejected by the determination unit 12, the RA procedure execution unit 11 may be configured to transmit a predetermined MAC-CE in response to a MAC-CE (Media Access Control-Control Element) received from the mobile station UE in the above RA procedure.

In this case, the RA procedure execution unit 11 may be configured to transmit a predetermined MAC-CE instead of transmitting PDCCH using C-RNTI notified by MAC-CE received from the mobile station UE, or to transmit the predetermined MAC-CE in addition to the PDCCH using C-RNTI.

Here, the predetermined MAC-CE may be a newly specified MAC-CE (new MAC-CE) or an existing "DRX Command MAC Control Element".

Further, the RA procedure execution unit 11 may be configured to notify, by a predetermined MAC-CE, a wait time before the mobile station UE can attempt the RA procedure again.

Figure 3:
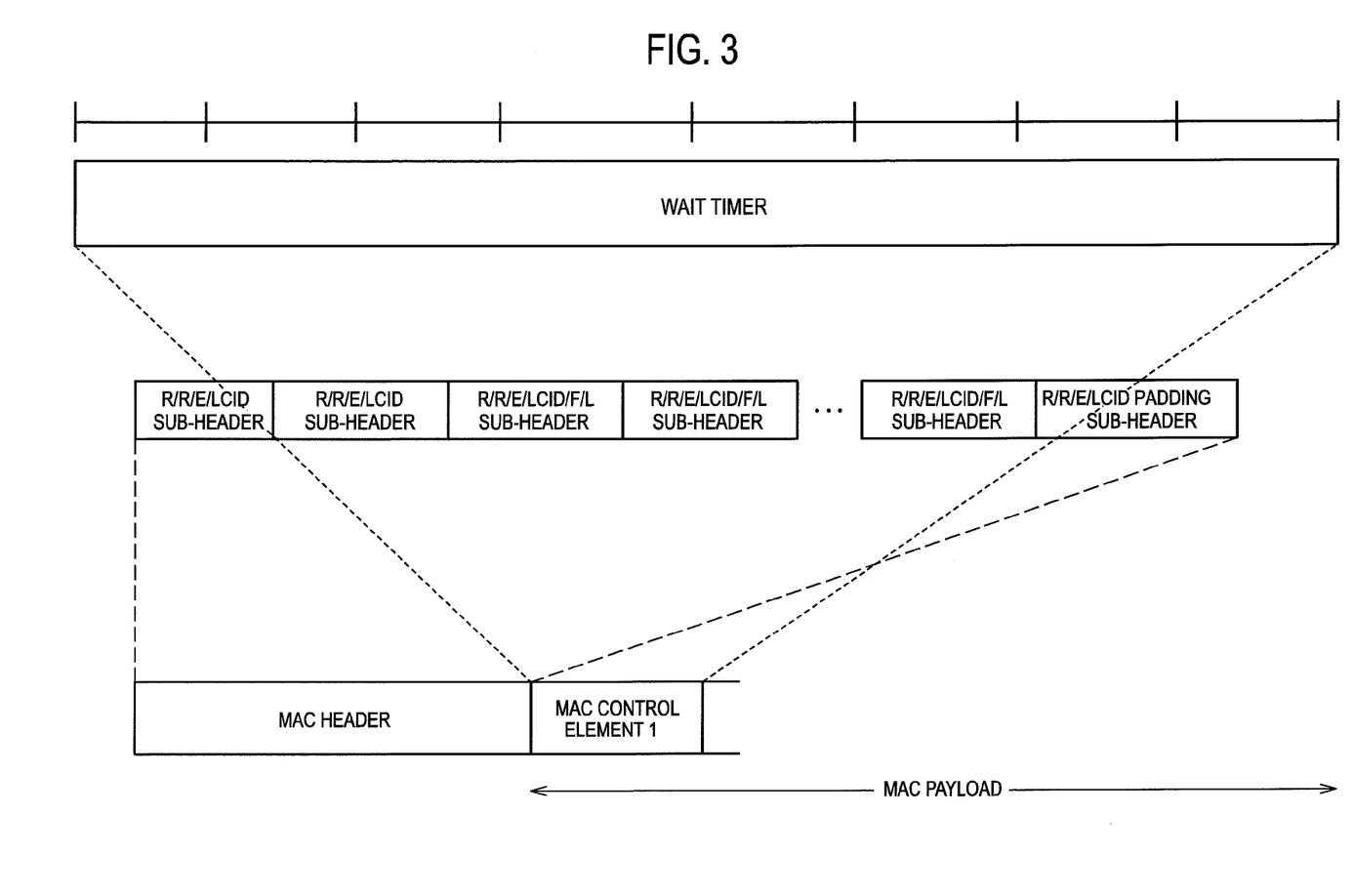
FIG. 3 is a diagram showing an example of MAC-CE transmitted by the radio base station according to the first embodiment of the present invention.

In this case, the new MAC-CE may be configured, for example, in such a manner that "Wait timer" indicating a wait time before the mobile station UE can attempt the RA procedure again can be notified as shown in FIG. 3. For example, the unit established in "Wait timer" may be "second", "minute", etc.

Figure 4:
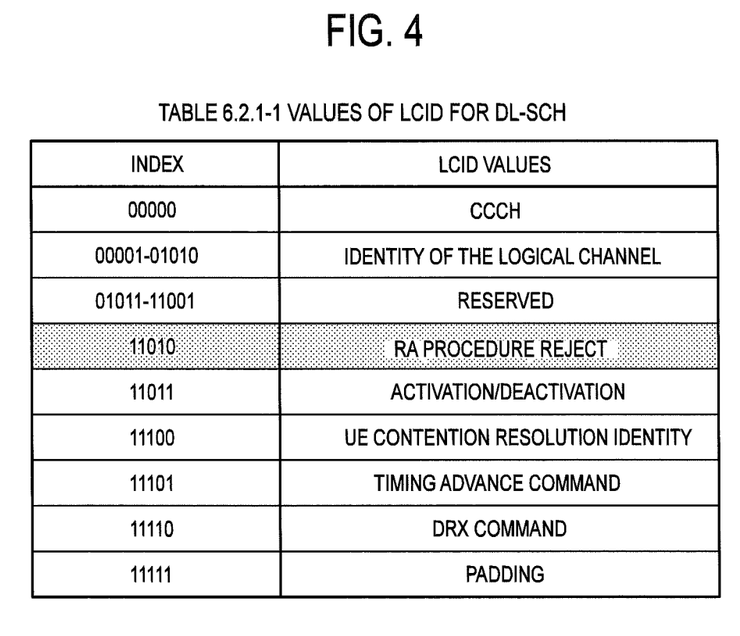
FIG. 4 is a diagram showing an example of MAC-CE transmitted by the radio base station according to the first embodiment of the present invention.

LCID (Logical Channel ID) given to the new MAC-CE may be configured, for example, so as to become "11010", as shown in FIG. 4.

Alternatively, the RA procedure execution unit 11 may be configured to notify the wait time before the mobile station UE can attempt the RA procedure again, by the RRC message (individual signaling) such as, for example, "RACH-ConfigCommon" transmitted when the RRC connection is established.

Figure 5:
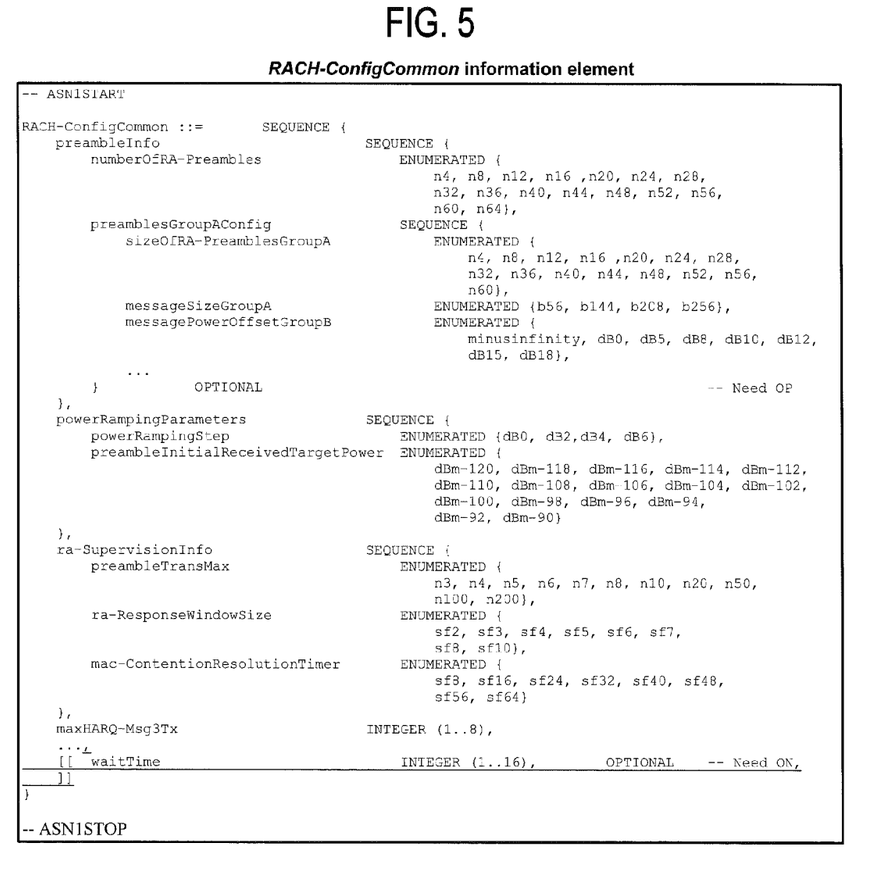
FIG. 5 is a diagram showing an example of "RACH-ConfigCommon" transmitted by the radio base station according to the first embodiment of the present invention.

In this case, "RACH-ConfigCommon" may be configured, for example, so as to notify "Wait Time" indicating a wait time before the mobile station UE can attempt the RA procedure again, as shown in FIGS. 5 and 6. For example, the unit established in "Wait timer" may be "second", "minute", etc.

Alternatively, the RA procedure execution unit 11 may be configured to notify a wait time before the mobile station UE can attempt the RA procedure again, by the RRC message (individual signaling) during RRC connection reconfiguration.

Alternatively, the RA procedure execution unit 11 may be configured to notify the wait time before the mobile station UE can attempt the RA procedure again, by "RACH Config IE" of SIB (System Information Block).

Figure 7:
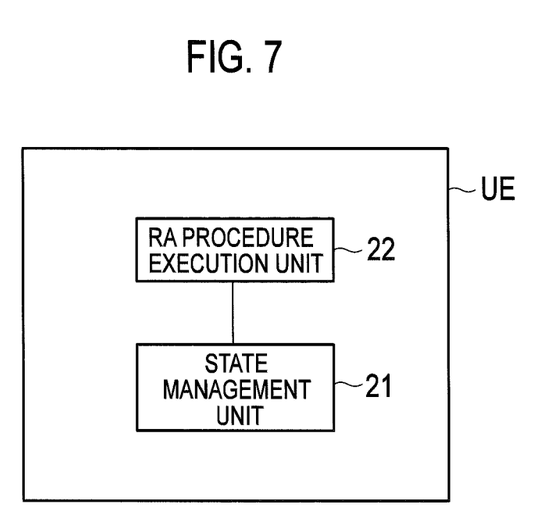
FIG. 7 is a functional block diagram of a mobile station according to the first embodiment of the present invention.

As shown in FIG. 7, the mobile station UE includes a state management unit 21, and a RA procedure execution unit 22.

The state management unit 21 is configured to manage state of the mobile station UE such as, for example, DRX state, non-DRX state (RRC_CONNECTED state), and RRC_IDLE state.

The RA procedure execution unit 22 is configured to perform the RA procedure with the radio base station eNB.

For example, when the mobile station UE returns from the DRX state to the non-DRX state or when the mobile station UE shifts from the RRC_IDLE state to the RRC_CONNECTED state, the RA procedure execution unit 22 is configured to execute the RA procedure with the radio base station eNB.

In the RA procedure for the mobile station UE returning from the DRX state to the non-DRX state, when the RA procedure execution unit 22 receives a predetermined MAC-CE from the radio base station eNB instead of PDCCH using C-RNTI notified by MAC-CE transmitted to the radio base station eNB, the state management unit 21 is configured to determine that the mobile station UE remains in the DRX state instead of returning from the DRX state to the non-DRX state.

Further, when being notified of "Wait timer" by a predetermined MAC-CE, the RA procedure execution unit 22 may be configured not to attempt the above RA procedure until the "Wait Timer" elapses.

Alternatively, when receiving a predetermined MAC-CE and being notified of "waitTime" by "RACH-ConfigCommon", the RA procedure execution unit 22 may be configured not to attempt the above RA procedure until the "waitTime" elapses.

Alternatively, when receiving a predetermined MAC-CE, the RA procedure execution unit 22 may be configured not to attempt the above RA procedure for a specific period of time, such as, for example, a period corresponding to 10 times (9600 ms) the maximum value (960 ms) of the existing "Backoff timer".

Hereinafter, the operation of the mobile communication system according to this embodiment is described with reference to FIG. 8.

Figure 8:
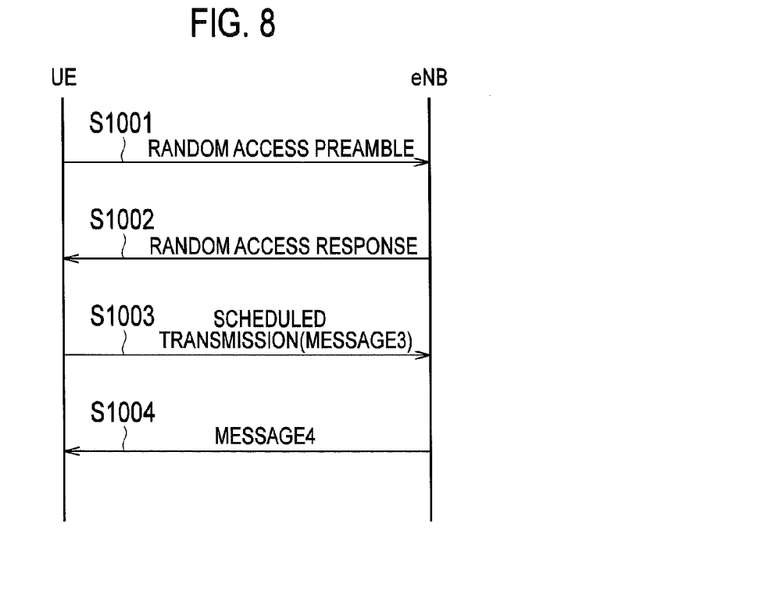
FIG. 8 is a flowchart for illustrating the operation of the mobile communication system according to the first embodiment of the present invention.

As shown in FIG. 8, when it is determined to return from the DRX state to the non-DRX state, the mobile station UE transmits "Random Access Preamble (RA Preamble)" to the radio base station eNB at Step S1001 to start a random access procedure (Contention Based RA Procedure).

At Step S1002, the radio base station eNB transmits "Random Access Response" to the mobile station UE.

At Step S1003, the mobile station UE transmits only MAC-CE notifying C-RNTI of the mobile station UE as "Scheduling Transmission (Message3)" to the radio base station eNB.

When it is determined to reject the above return, the radio base station eNB transmits, at Step S1004, the above predetermined MAC-CE as "Message4" in response to MAC-CE to the mobile station UE.

According to an aspect of this embodiment, the radio base station eNB can reject a RA procedure when returning from the DRX state to the non-DRX state. Accordingly, even when transmission processing by a mobile station UE in the RRC_CONNECTED state and in the DRX state occurs frequently, probability of successfully performing transmission processing by a priority terminal and transmission processing of an emergency call can be improved.

(Mobile Communication System According to the Second Embodiment of the Present Invention)

Hereinafter, with reference to FIG. 9, the mobile communication system according to the second embodiment of the present invention is described by focusing on differences thereof from the mobile communication system according to the first embodiment described above.

In the mobile communication system according to this embodiment, a RA procedure execution unit 11 of a radio base station eNB may be configured to, when rejecting return of the mobile station UE from the DRX state to the non-DRX state, transmit a PDCCH using a predetermined RNTI instead of transmitting a PDCCH using C-RNTI notified by MAC-CE received from the mobile station UE in the above RA procedure.

Figure 9:
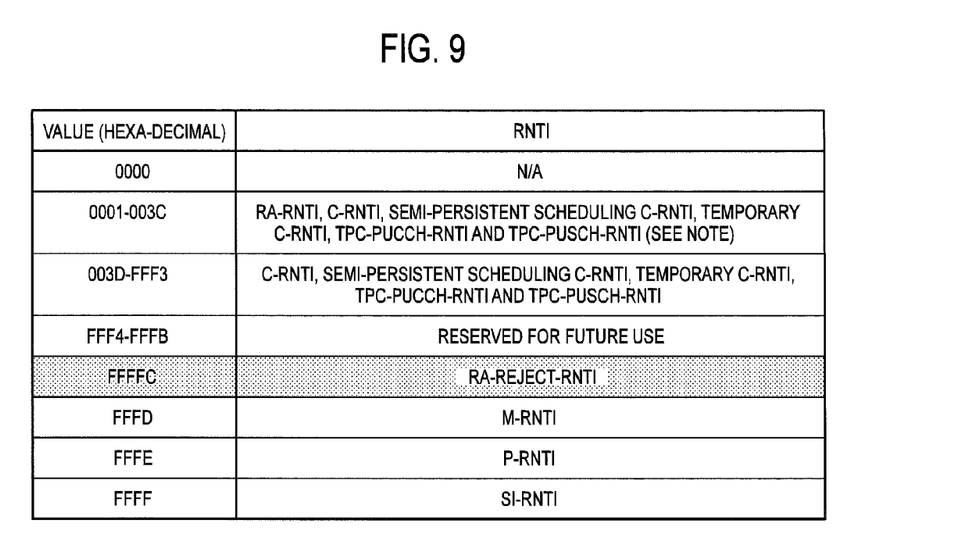
FIG. 9 is a diagram showing an example of RNTI used by a radio base station according to a second embodiment of the present invention.

In this case, the RA procedure execution unit 11 may be configured to use, for example, "FFFFC" being a reserve bit not used currently, as the predetermined RNTI as shown in FIG. 9.

In the above RA procedure, when the RA procedure execution unit 22 of the mobile station UE receives a PDCCH using a predetermined RNTI instead of a PDCCH using C-RNTI notified by MAC-CE transmitted to the radio base station eNB, from the radio base station eNB, the state management unit 21 of the mobile station UE is configured to determine that the mobile station UE remains in the DRX state instead of returning from the DRX state to the non-DRX state.

Modification 1

Hereinafter, with reference to FIG. 10, the mobile communication system according to Modification 1 of the present invention is described by focusing on differences thereof from the mobile communication systems according to the first and second embodiments described above.

In the mobile communication system according to Modification 1, a RA procedure execution unit 11 of a radio base station eNB is configured not to reject a RA procedure from a priority terminal which is a mobile station UE having AC (Access Class) 11 to 15.

That is, even when rejecting a RA procedure for a non-priority terminal returning from the DRX state to the non-DRX state, the RA procedure execution unit 11 is configured not to reject a RA procedure for a priority terminal returning from the DRX state to the non-DRX state.

For this reason, the RA procedure execution unit 11 is configured to store C-RNTIs expended to a priority terminal out of C-RNTIs expended during RRC connection establishment.

Then, when determined, in a RA procedure for the mobile station UE returning from the DRX state to the non-DRX state, that C-RNTI notified by MAC-CE as "Message3" is C-RNTI expended to a priority terminal, the RA procedure execution unit 11 is configured to accept the RA procedure even when the radio access network is congested.

Hereinafter, the mobile communication system according to Modification 1 of the present invention is described with reference to FIG. 10.

Figure 10:
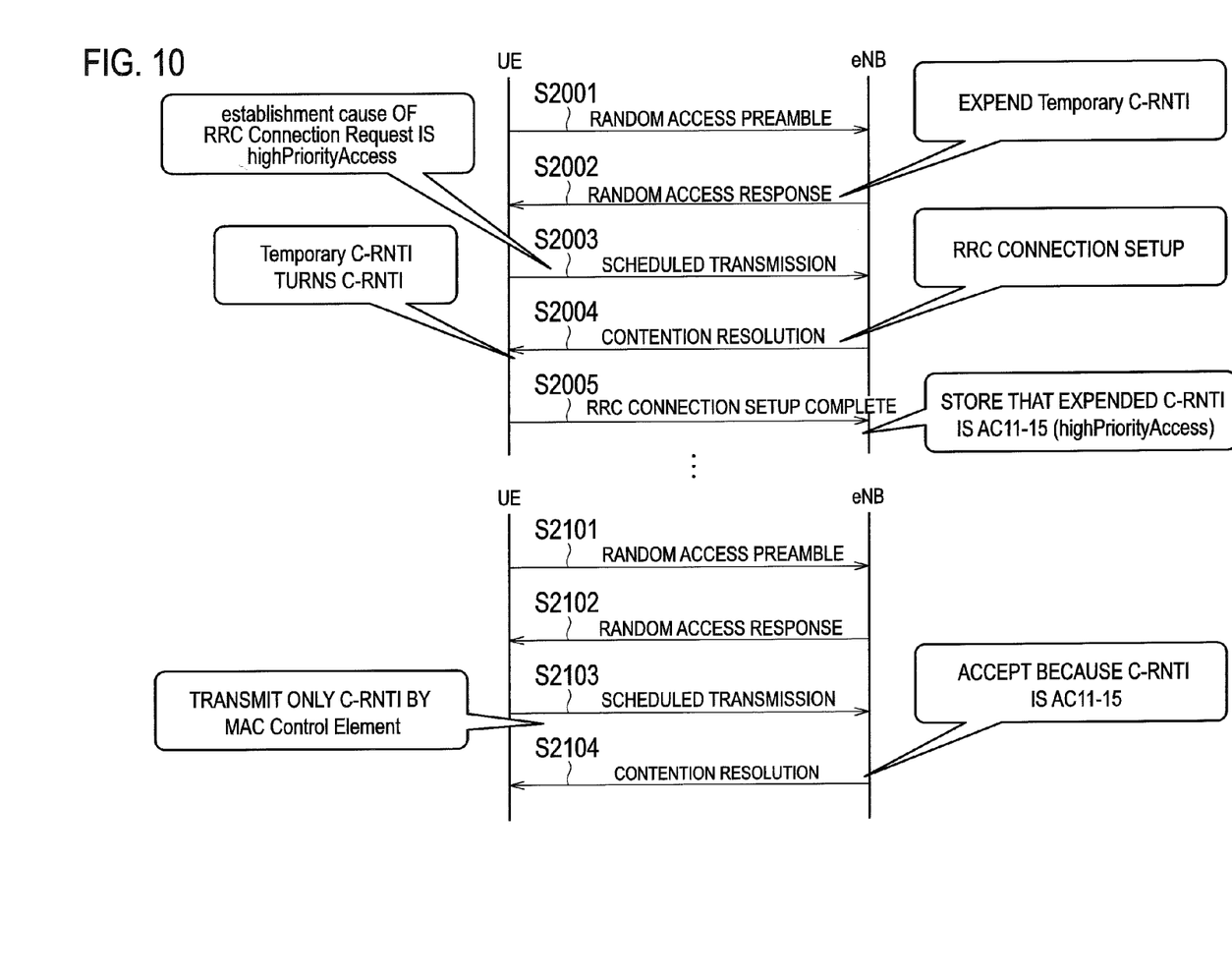
FIG. 10 is a flowchart for illustrating the operation of a mobile communication system according to Modification 1 of the present invention.

As shown in FIG. 10, when it is determined to shift from the RRC_IDLE state to the RRC_CONNECTED state, the mobile station UE transmits "Random Access Preamble" to the radio base station eNB at Step S2001 to start a random access procedure.

At Step S2002, the radio base station eNB expends a temporary C-RNTI and transmits "Random Access Response" notifying the temporary C-RNTI to the mobile station UE.

At Step S2003, the mobile station UE transmits "RRC Connection Request" as "Scheduling Transmission (Message3)" to the radio base station eNB, the "RRC Connection Request" being established as "establishment cause: highPriorityAccess".

Here, the radio base station eNB detects according to "establishment cause: highPriorityAccess" that the mobile station UE is a priority terminal.

At Step S2004, the radio base station eNB transmits "RRC Connection Setup" as "Contention Resolution (Message4)" to the mobile station UE.

Here, the mobile station UE handles a temporary C-RNTI as a formal C-RNTI of the mobile station UE.

At Step S2005, the mobile station UE transmits "RRC Connection Setup Complete" to the radio base station eNB.

Here, the radio base station eNB stores the C-RNTI expended to the mobile station UE as a C-RNTI expended to a priority terminal.

Then, when it is determined to return from the DRX state to the non-DRX state, the mobile station UE shifted to the DRX state transmits "Random Access Preamble" to the radio base station eNB at Step S2101 to start a random access procedure (Contention Based RA Procedure).

At Step S2102, the radio base station eNB transmits "Random Access Response" to the mobile station UE.

At Step S2103, the mobile station UE transmits only MAC-CE notifying C-RNTI of the mobile station UE as "Scheduling Transmission (Message3)" to the radio base station eNB.

Even when the radio base station eNB determines that C-RNTI of the mobile station UE is the C-RNTI expended to a priority terminal and the radio access network is congested or even when a RA procedure for a non-priority terminal returning from the DRX state to the non-DRX state is rejected, the radio base station eNB determines to accept the RA procedure, and at Step S1004, transmits, to the mobile station UE, a PDCCH using C-RNTI of the mobile station UE notified by MAC-CE as "Contention Resolution (Message4)".

Modification 2

Hereinafter, the mobile communication system according to Modification 2 of the present invention is described by focusing on differences thereof from the mobile communication system according to the first embodiment described above.

In the mobile communication system according to Modification 2, a RA procedure execution unit 11 of a radio base station eNB is configured to transmit, at Step S1004 of the RA procedure shown in FIG. 8, "RRC Connection Release" in response to MAC-CE received from the mobile station UE at Step S1003, when rejecting return of the mobile station UE from the DRX state to the non-DRX state.

Here, the RA procedure execution unit 11 may be configured to shift the mobile station UE to the RRC_IDLE state by "RRC Connection Release".

On the other hand, when the RA procedure execution unit 22 of the mobile station UE receives "RRC Connection Release" from the radio base station eNB at Step S1004 of the RA procedure shown in FIG. 8, the state management unit 21 of the mobile station UE is configured to determine to shift to the RRC_IDLE state.

Here, when "waitTime" is notified by "RRC Connection Release", the RA procedure execution unit 22 of the mobile station UE may be configured not to attempt the above RA procedure until the "waitTime" elapses in the RRC_IDLE state. Further, in the RRC_IDLE state, the network may apply ACB for the RRC_IDLE state or may broadcast ACB information.

The features of the present invention may also be expressed as follows.

A first feature of this embodiment is summarized as a radio base station eNB including: a RA procedure execution unit 11 configured to execute a RA procedure (a random access procedure) with a mobile station UE when the mobile station UE returns from a non-DRX state (an intermittent reception state) to a DRX state (a continuous reception state). Here, the RA procedure execution unit 11 is configured to transmit a predetermined MAC-CE in response to a MAC-CE (MAC control element) received from the mobile station UE in the RA procedure, when rejecting the return.

A second feature of this embodiment is summarized as a radio base station eNB including: a RA procedure execution unit 11 configured to execute a RA procedure with a mobile station UE when the mobile station UE returns from a DRX state to a non-DRX state. Here, the RA procedure execution unit 11 is configured to transmit a PDCCH using a predetermined RNTI instead of transmitting a PDCCH using a C-RNTI notified by a MAC-CE received from the mobile station UE in the RA procedure, when rejecting the return.

In the first feature of this embodiment, the RA procedure execution unit 11 may be configured to notify "Wait Timer" indicating a wait time before the mobile station UE can attempt the RA procedure again, by the predetermined MAC-CE.

In the first or second feature of this embodiment, the RA procedure execution unit 11 may be configured to notify "Wait Time" indicating a wait time before the mobile station UE can attempt the RA procedure again, by "RACH-ConfigCommon (a RRC message)."

A third feature of this embodiment is summarized as a mobile station UE including: a RA procedure execution unit 22 configured to execute a RA procedure with a radio base station eNB when returning from a DRX state to a non-DRX state; and a state management unit 21 configured to determine to remain in the DRX state when the RA procedure execution unit 22 receives, in the RA procedure, a predetermined MAC-CE in response to a MAC-CE transmitted from the mobile station UE to the radio base station eNB.

A fourth feature of this embodiment is summarized as a mobile station UE including: a RA procedure execution unit 22 configured to execute a RA with a radio base station eNB when returning from a DRX state to a non-DRX state; and a state management unit 21 configured to determine to remain in the DRX state when the RA procedure execution unit 22 receives, in the RA procedure, a PDCCH using a predetermined RNTI instead of a PDCCH using a C-RNTI notified by a MAC-CE transmitted from the mobile station UE to the radio base station eNB.

In the third feature of this embodiment, when being notified of "Wait Time" by the predetermined MAC-CE, the RA procedure execution unit 22 may be configured not to attempt the RA procedure until the "Wait Time" elapses.

In the third feature of this embodiment, when receiving the predetermined MAC-CE and being notified of "Wait Time" by "RACH-ConfigCommon", the RA procedure execution unit 22 may be configured not to attempt the RA procedure until the "Wait Time" elapses.

In the fourth feature of this embodiment, when receiving a PDCCH using the predetermined RNTI and being notified of "Wait Time" by "RACH-ConfigCommon", the RA procedure execution unit 22 may be configured not to attempt the random access procedure until the "Wait Time" elapses.

A fifth feature of this embodiment is summarized as a radio base station eNB including: a RA procedure execution unit 11 configured to execute a RA procedure with a mobile station UE when the mobile station UE returns from a DRX state to a non-DRX state. Here, the RA procedure execution unit 11 may be configured to transmit "RRC Connection Release (a connection release message)" in response to a MAC-CE received from the mobile station UE in the RA procedure, when rejecting the return.

In the fifth feature of this embodiment, the RA procedure execution unit 11 may be configured to notify "Wait Time" indicating a wait time before the mobile station can attempt the random access procedure again, by "RRC Connection Release."

A sixth feature of this embodiment is summarized as a mobile station UE including: a RA procedure execution unit 22 configured to execute a RA procedure with a radio base station eNB when returning from a DRX state to a non-DRX state; and a state management unit 21 configured to determine to remain in the DRX state when the RA procedure execution unit 22 receives, in the RA procedure, "RRC Connection Release" in response to a MAC-CE transmitted from the mobile station UE to the radio base station eNB.

In the sixth feature of this embodiment, when being notified of "Wait Time" by "RRC Connection Release", the RA procedure execution unit 22 may be configured not to attempt the RA procedure until the "Wait Time" elapses.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire contents of Japanese Patent Application No. 2012-114786 (filed on May 18, 2012) and Japanese Patent Application No. 2012-152343 (filed on Jul. 6, 2012) are incorporated by reference in the present specification.

INDUSTRIAL APPLICABILITY

As described above, an aspect of the present invention provides a radio base station and a mobile station capable of improving the probability of successfully performing transmission processing by a priority terminal and transmission processing of an emergency call even during congestion.

EXPLANATION OF THE REFERENCE NUMERALS

UE mobile station
eNB radio base station
11, 22 RA procedure execution unit
12 determination unit
21 state management unit

The invention claimed is:

1. A radio base station including a processor, the processor comprising:
a random access procedure execution unit configured to execute a random access procedure with a mobile station when the mobile station returns from a Discontinuous Reception (DRX) state in a Radio Resource Control Connected (RRC_CONNECTED) state to a non-DRX state in the RRC_CONNECTED state, wherein
the random access procedure execution unit is configured to transmit a physical downlink control channel using a Cell-Radio Network Temporary Identifier (C-RNTI) notified by a Media Access Control-Control Element (MAC-CE) received from the mobile station, when the mobile station is a priority terminal or the mobile station performs transmission processing of an emergency call, the random access procedure execution unit transmits a predetermined MAC control element in response to a MAC control element received from the mobile station in the random access procedure when the mobile station is not a priority terminal and the mobile station performs transmission processing other than transmission processing of an emergency call, and
the predetermined MAC control element indicates the mobile station remains in the DRX state in a RRC_CONNECTED state.

2. A radio base station including a processor, the processor comprising:
a random access procedure execution unit configured to execute a random access procedure with a mobile station when the mobile station returns from a Discontinuous Reception (DRX) state in a Radio Resource Control Connected (RRC_CONNECTED) state to a non-DRX state in the RRC_CONNECTED state, wherein
the random access procedure execution unit is configured to transmit a physical downlink control channel using a Cell-Radio Network Temporary Identifier (C-RNTI) notified by a Media Access Control-Control Element (MAC-CE) received from the mobile station, when the mobile station is a priority terminal or the mobile station performs transmission processing of an emergency call, the random access procedure execution unit transmits a physical downlink control channel using a predetermined RNTI instead of transmitting a physical downlink control channel using a C-RNTI notified by a MAC control element received from the mobile station in the Random Access (RA) procedure when the mobile station is not a priority terminal and the mobile station performs transmission processing other than transmission processing of an emergency call, and
the predetermined RNTI indicates the mobile station remains in the DRX state in a RRC_CONNECTED state.

3. The radio base station according to claim 1, wherein the random access procedure execution unit is configured to notify a wait time before the mobile station can attempt the random access procedure again, by the predetermined MAC control element.

4. The radio base station according to claim 1, wherein the random access procedure execution unit is configured to notify a wait time before the mobile station can attempt the random access procedure again, by a RRC message.

5. A mobile station including a processor, the processor comprising:
a random access procedure execution unit and a state management unit, wherein
the random access procedure execution unit is configured to:
execute a random access procedure with a radio base station when returning from a Discontinuous Reception (DRX) state in a Radio Resource Control Connected (RRC_CONNECTED) state to a non-DRX state in the RRC_CONNECTED state,
receive a physical downlink control channel that uses a Cell-Radio Network Temporary Identifier (C-RNTI) notified by a Media Access Control-Control Element (MAC-CE) generated by the mobile station, when the mobile station is a priority terminal or when the mobile station performs transmission processing of an emergency call,
receive a predetermined MAC control element from the radio base station in response to a MAC control element sent from the mobile station in the random access procedure when the mobile station is not the priority terminal and the mobile station performs transmission processing other than transmission processing of an emergency call, the state management unit is configured to determine to remain in the DRX state in a RRC_CONNECTED state when the random access procedure execution unit receives, in the random access procedure, the predetermined MAC control element in response to the MAC control element transmitted from the mobile station to the radio base station, and the predetermined MAC control element indicates the mobile station remains in the DRX state in the RRC_CONNECTED state.

6. A mobile station including a processor, the processor comprising:

a random access procedure execution unit and a state management unit, wherein the random access procedure execution unit is configured to:

execute a random access procedure with a radio base station when returning from a Discontinuous Reception (DRX) state in a Radio Resource Control Connected (RRC_CONNECTED) state to a non-DRX state in the RRC_CONNECTED state, receive a physical downlink control channel that uses a Cell-Radio Network Temporary Identifier (C-RNTI) notified by a Media Access Control-Control Element (MAC-CE) generated by the mobile station, when the mobile station is a priority terminal or when the mobile station performs transmission processing of an emergency call, receive a predetermined MAC control element from the radio base station in response to a MAC control element sent from the mobile station in the random access procedure when the mobile station is not a priority terminal and the mobile station performs transmission processing other than transmission processing of an emergency call, the state management unit is configured to determine to remain in the DRX state in a RRC_CONNECTED state when the random access procedure execution unit receives, in the random access procedure, the physical downlink control channel using a predetermined RNTI instead of a physical downlink channel using the C-RNTI notified by the MAC control element transmitted from the mobile station to the radio base station, and the predetermined RNTI indicates the mobile station remains in the DRX state in the RRC_CONNECTED state.

7. The mobile station according to claim 5, wherein when being notified of a wait time by the predetermined MAC control element, the random access procedure execution unit is configured not to attempt the random access procedure until the wait time elapses.

8. The mobile station according to claim 5, wherein when receiving the predetermined MAC control element and being notified of a wait time by a RRC message, the random access procedure execution unit is configured not to attempt the random access procedure until the wait time elapses.

9. The mobile station according to claim 6, wherein when receiving a physical downlink control channel using the predetermined RNTI and being notified of a wait time by a RRC message, the random access procedure execution unit is configured not to attempt the random access procedure until the wait time elapses.

10. A radio base station including a processor, the processor comprising:

a random access procedure execution unit configured to:

execute a random access procedure with a mobile station when the mobile station returns from a Discontinuous Reception (DRX) state in a Radio Resource Control Connected (RRC_CONNECTED) state to a non-DRX state in the RRC_CONNECTED state in response to UL data arrival, transmit a physical downlink control channel using a Cell-Radio Network Temporary Identifier (C-RNTI) notified by a Media Access Control-Control Element (MAC-CE) received from the mobile station, when the mobile station is a priority terminal or the mobile station performs transmission processing of an emergency call, transmit a connection release message in response to a MAC control element received from the mobile station in the random access procedure, the mobile station is not a priority terminal and the mobile station performs transmission processing other than transmission processing of an emergency call.

11. The radio base station according to claim 10, wherein the random access procedure execution unit is configured to notify a wait time before the mobile station can attempt the random access procedure again, by the connection release message.

12. A mobile station including a processor, the processor comprising:

a random access procedure execution unit and a state management unit, wherein the random access procedure execution unit is configured to:

execute a random access procedure with a radio base station when returning from a Discontinuous Reception (DRX) state in a Radio Resource Control Connected (RRC_CONNECTED) state to a non-DRX state in the RRC_CONNECTED state in response to UL data arrival, receive a physical downlink control channel that uses a Cell-Radio Network Temporary Identifier (C-RNTI) notified by Media Access Control-Control Element (MAC-CE) generated by the mobile station, when the mobile station is a priority terminal or when the mobile station performs transmission processing of an emergency call, receive a predetermined MAC control element from the radio base station in response to a MAC control element sent from the mobile station in the random access procedure when the mobile station is not a priority terminal and the mobile station performs transmission processing other than transmission processing of an emergency call, and the state management unit is configured to determine to remain in the DRX state in the RRC_CONNECTED state when the random access procedure execution unit receives, in the random access procedure, a connection release message in response to the MAC control element transmitted from the mobile station to the radio base station.

13. The mobile station according to claim 12, wherein when being notified of a wait time by the connection release message, the random access procedure execution unit is configured not to attempt the random access procedure until the wait time elapses.

14. The radio base station according to claim 2, wherein the random access procedure execution unit is configured to notify a wait time before the mobile station can attempt the random access procedure again, by a RRC message.

15. The radio base station according to claim 1, the processor further comprising a determination unit that determines whether or not to accept the return of the mobile station from the DRX state in the RRC_CONNECTED state to the non-DRX state in the RRC_CONNECTED state, in a Contention Based RA procedure for the return.

16. The radio base station according to claim 1, wherein the priority terminal is a terminal having AC (Access Class) 11 to 15.

17. The radio base station according to claim 2, the processor further comprising a determination unit that determines whether or not to accept the return of the mobile station from the DRX state in the RRC_CONNECTED state to the non-DRX state in the RRC_CONNECTED state, in a Contention Based RA procedure for the return.

18. The radio base station according to claim 2, wherein the priority terminal is a terminal having AC (Access Class) 11 to 15.

19. The radio base station according to claim 10, the processor further comprising a determination unit that determines whether or not to accept the return of the mobile station from the DRX state in the RRC_CONNECTED state to the non-DRX state in the RRC_CONNECTED state, in a Contention Based Random Access (RA) procedure for the return.

20. The radio base station according to claim 10, wherein the priority terminal is a terminal having AC (Access Class) 11 to 15.

21. The mobile station according to claim 5, wherein the priority terminal is a terminal having AC (Access Class) 11 to 15.

22. The mobile station according to claim 6, wherein the priority terminal is a terminal having AC (Access Class) 11 to 15.

23. The mobile station according to claim 12, wherein the priority terminal is a terminal having AC (Access Class) 11 to 15.

* * * * *